United States Patent
Jun et al.

(10) Patent No.: US 11,190,810 B2
(45) Date of Patent: Nov. 30, 2021

(54) DEVICE AND METHOD FOR COMPRESSING IMAGE DATA USING QUANTIZATION PARAMETER AND ENTROPY TABLES

(71) Applicant: SAMSUNG ELECTRONICS CO., LTD., Suwon-si (KR)

(72) Inventors: Sung Ho Jun, Hwaseong-si (KR); Yo-Han Lim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 242 days.

(21) Appl. No.: 16/205,900

(22) Filed: Nov. 30, 2018

(65) Prior Publication Data

US 2019/0238894 A1    Aug. 1, 2019

(30) Foreign Application Priority Data

Jan. 26, 2018 (KR) .................. 10-2018-0010083
Apr. 10, 2018 (KR) .................. 10-2018-0041781

(51) Int. Cl.
*H04N 19/91* (2014.01)
*H04N 19/184* (2014.01)
*H04N 19/124* (2014.01)
*H04N 19/423* (2014.01)

(52) U.S. Cl.
CPC .......... *H04N 19/91* (2014.11); *H04N 19/124* (2014.11); *H04N 19/184* (2014.11); *H04N 19/423* (2014.11)

(58) Field of Classification Search
None
See application file for complete search history.

(56) References Cited

U.S. PATENT DOCUMENTS

| | | | |
|---|---|---|---|
| 6,118,903 A | 9/2000 | Liu | |
| 7,206,453 B2 | 4/2007 | Lee et al. | |
| 7,366,240 B2 * | 4/2008 | Yin | H04N 19/176 375/240.02 |
| 7,848,586 B2 | 12/2010 | Kim et al. | |
| 8,666,186 B1 | 3/2014 | Rasche | |

(Continued)

FOREIGN PATENT DOCUMENTS

| | | |
|---|---|---|
| EP | 0912062 | 4/1999 |
| JP | 6069128 | 2/2017 |

OTHER PUBLICATIONS

Sampaio, Felipe et al., "Content-Adaptive Reference Frame Compression Based on Intra-frame Prediction for Multiview Video Coding", 2013 IEEE, pp. 1831-1835.

(Continued)

*Primary Examiner* — Tahmina N Ansari
(74) *Attorney, Agent, or Firm* — F. Chau & Associates, LLC

(57) ABSTRACT

An image processing device includes a multimedia intellectual (IP) block which processes image data; a memory; and a frame buffer compressor (FBC) which compresses the image data to generate compressed data and stores the compressed data in the memory. The frame buffer compressor includes a logic circuit which determines a combination of a quantization parameter (QP) table and an entropy table and controls compression of the image data based on the determined combination of the QP table and the entropy table.

19 Claims, 12 Drawing Sheets

(56) References Cited

U.S. PATENT DOCUMENTS

| | | |
|---|---|---|
| 9,113,165 B2 | 8/2015 | Gish et al. |
| 10,362,315 B2* | 7/2019 | Jun .................. H04N 19/172 |
| 10,448,027 B2* | 10/2019 | Jun .................. H04N 19/124 |
| 10,506,233 B2* | 12/2019 | Jun .................. H04N 19/146 |
| 10,674,160 B2* | 6/2020 | Jun .................. H04N 19/567 |
| 2002/0044695 A1 | 4/2002 | Bostrom |
| 2010/0098166 A1 | 4/2010 | Budagavi et al. |
| 2011/0150072 A1 | 6/2011 | Han |
| 2012/0269258 A1* | 10/2012 | Yang .................. H04N 19/172 |
| | | 375/240.02 |
| 2014/0146872 A1 | 5/2014 | Du et al. |
| 2015/0071344 A1* | 3/2015 | Tourapis ............. H04N 19/126 |
| | | 375/240.03 |
| 2016/0134877 A1 | 5/2016 | Chong et al. |
| 2017/0084336 A1 | 3/2017 | Zhang et al. |
| 2017/0188026 A1 | 6/2017 | Wu et al. |

OTHER PUBLICATIONS

Written Opinion and Search Report dated Oct. 4, 2019 Corresponding to Related Singapore Patent Application No. 10201809263U.

* cited by examiner

FIG. 7

QP TABLE(230)

| Index | QP |
|---|---|
| 0 | MIN = MaxShiftValue |
| 1 | SampleValue |
| 2 | SampleValue |
| 3 | SampleValue |
| 4 | SampleValue |
| 5 | SampleValue |
| 6 | SampleValue |
| 7 | MAX = MaxShiftValue >> BitDepth X (1 - CompressionRatio) |

FIG. 8

QP TABLE(232)

| Index | QP |
|---|---|
| 0 | MIN = 4096 |
| 1 | 1365 |
| 2 | 819 |
| 3 | 585 |
| 4 | 455 |
| 5 | 372 |
| 6 | 315 |
| 7 | MAX = 4096 >> 8 X (1 - 0.5) = 256 |

MaxShiftValue = 4096
BitDepth = 8
CompressionRatio = 0.5 (50%)

FIG. 9

QP TABLE(234)

| Index | QP |
|---|---|
| 0 | MIN = 4096 |
| 1 | 819 |
| 2 | 455 |
| 3 | 293 |
| 4 | 216 |
| 5 | 171 |
| 6 | 146 |
| 7 | MAX = 4096 >> 10 X (1 - 0.5) = 128 |

MaxShiftValue = 4096
BitDepth = 10
CompressionRatio = 0.5 (50%)

FIG. 10

COMPRESSED BIT STREAM(236)

| 4bit QP | 2bit K | compressed binary |
|---|---|---|

FIG. 11

QP TABLE(240)

| Index | QP |
|---|---|
| 0 | MIN = MaxShiftValue |
| 1 | SampleValue |
| 2 | SampleValue |
| 3 | SampleValue |
| 4 | SampleValue |
| 5 | SampleValue |
| 6 | SampleValue |
| 7 | SampleValue |
| 8 | SampleValue |
| 9 | SampleValue |
| 10 | SampleValue |
| 11 | SampleValue |
| 12 | SampleValue |
| 13 | SampleValue |
| 14 | SampleValue |
| 15 | MAX = MaxShiftValue >> BitDepth X (1 - CompressionRatio) |

FIG. 12

QP TABLE(242)

| Index | QP |
|---|---|
| 0 | MIN = 4096 |
| 1 | 2048 |
| 2 | 1365 |
| 3 | 1024 |
| 4 | 819 |
| 5 | 683 |
| 6 | 585 |
| 7 | 512 |
| 8 | 455 |
| 9 | 410 |
| 10 | 372 |
| 11 | 341 |
| 12 | 315 |
| 13 | 293 |
| 14 | 273 |
| 15 | MAX = 4096 >> 8 X (1 - 0.5) = 256 |

MaxShiftValue = 4096
BitDepth = 8
CompressionRatio = 0.5 (50%)

FIG. 13

QP TABLE(244)

| Index | QP |
|---|---|
| 0 | MIN = 4096 |
| 1 | 1365 |
| 2 | 819 |
| 3 | 585 |
| 4 | 455 |
| 5 | 372 |
| 6 | 315 |
| 7 | 273 |
| 8 | 228 |
| 9 | 205 |
| 10 | 186 |
| 11 | 171 |
| 12 | 158 |
| 13 | 146 |
| 14 | 137 |
| 15 | MAX = 4096 >> 10 X (1 - 0.5) = 128 |

MaxShiftValue = 4096
BitDepth = 10
CompressionRatio = 0.5 (50%)

COMPRESSED BIT STREAM(246)

| 4bit QP | 2bit K | compressed binary |

| Num of QP | Num of K | Num of data | PSNR gain(dB) |
|---|---|---|---|
| 12 | 8 | 96 | +0.1 ~ +0.2 |
| 12 | 4 | 48 | -0.1 ~ -0.4 |
| 12 | 1 | 12 | -3.5 ~ -6 |
| 8 | 8 | 64 | -0.3 ~ -2.2 |
| 8 | 4 | 32 | -0.6 ~ -2.7 |
| 8 | 1 | 8 | -3.8 ~ -8.2 |

DEVICE AND METHOD FOR COMPRESSING IMAGE DATA USING QUANTIZATION PARAMETER AND ENTROPY TABLES

CROSS-REFERENCE TO RELATED APPLICATIONS

This application claims the benefit of priority under 35 U.S.C. 119 to Korean Patent Application No. 10-2018-0010083, filed on Jan. 26, 2018, and Korean Patent Application No. 10-2018-0041781, filed on Apr. 10, 2018, in the Korean Intellectual Property Office, the disclosures of which are incorporated by reference in their entireties herein.

BACKGROUND

1. Technical Field

The present disclosure relates to an image processing device and method for operating an image processing device.

2. Discussion of Related Art

More and more applications demand high-definition video images and high-frame rate images. Accordingly, the amount of data accessed from a memory (i.e., the bandwidth) storing these images by various multimedia Intellectual Property (IP) blocks of image processing devices has greatly increased.

Each image processing device has limited processing capability. When the bandwidth increases, the processing capability of the image processing device may reach this limit. Accordingly, a user of the image processing device may experience a decrease in speed while recording or playing a video image.

SUMMARY

At least one embodiment of the present inventive concept provides an image processing device that executes optimized image data compression.

At least one embodiment of the present inventive concept provides a method for operating an image processing device that executes optimized image data compression.

According to an exemplary embodiment of the present inventive concept, there is provided an image processing device including a multimedia intellectual property (IP) block which processes image data; a memory; and a frame buffer compressor (FBC) which compresses the image data to generate compressed data and stores the compressed data in the memory. The frame buffer compressor includes a logic circuit which determines a combination of a quantization parameter (QP) table and an entropy table and controls compression of the image data based on the determined combination of the QP table and the entropy table.

According to an exemplary embodiment of the present inventive concept, there is provided an image processing device including a multimedia IP block which processes image data; a memory; and a frame buffer compressor (FBC) which compresses the image data to generate compressed data and stores the compressed data in the memory. The frame buffer compressor includes a logic circuit which determines a quantization parameter (QP) table including a maximum of 16 entries and an entropy table determined by a maximum of 4 k values for entropy encoding, and controls compression of the image data based on the determined combination of the QP table and the entropy table.

According to an exemplary embodiment of the present inventive concept, there is provided a method for operating an image processing device including converting image data into predicted image data including prediction data and residual data; determining a quantization parameter (QP) table including a predetermined number of entries; quantizing the predicted image data, using the determined QP table; determining an entropy table, using a predetermined number of k values for entropy encoding; and performing the entropy coding on the quantized image data, using the determined entropy table to generate compressed data.

BRIEF DESCRIPTION OF THE DRAWINGS

The present invention will become more apparent by describing in detail exemplary embodiments thereof with reference to the attached drawings, in which:

FIGS. 7 to 10 are schematic diagrams for explaining an operation of the image processing device according to exemplary embodiments of the present inventive concept;

FIGS. 11 to 14 are schematic diagrams for explaining an operation of the image processing device according to exemplary embodiments of the present inventive concept;

FIG. 15 is a diagram for explaining advantageous effects of the image processing device and the method for operating the image processing device according to exemplary embodiments of the present inventive concept.

DETAILED DESCRIPTION OF THE EMBODIMENTS

Figure 1:
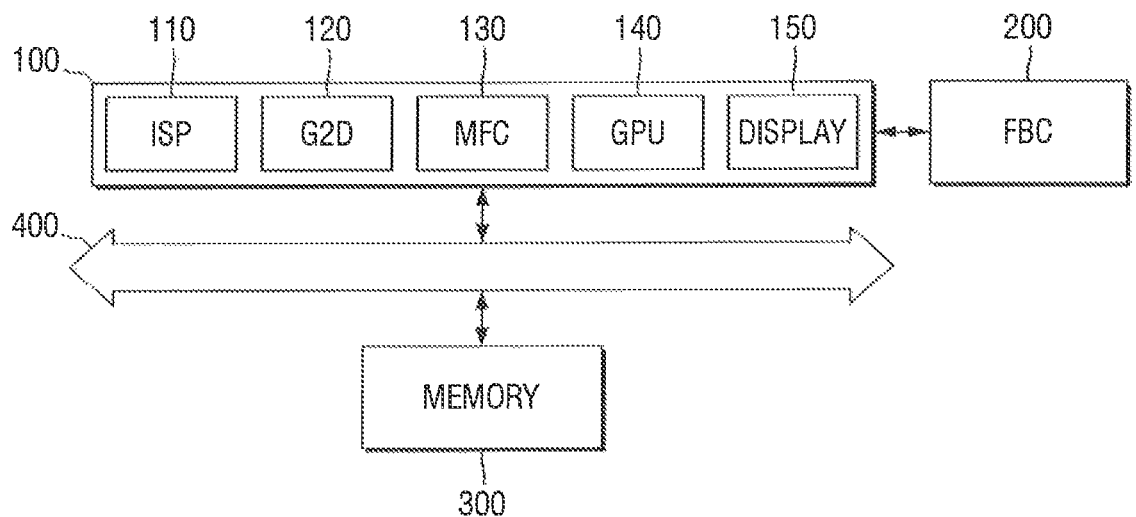
FIGS. 1 to 3 are block diagrams for explaining an image processing device according to some embodiments of the present inventive concept.
Figure 2:
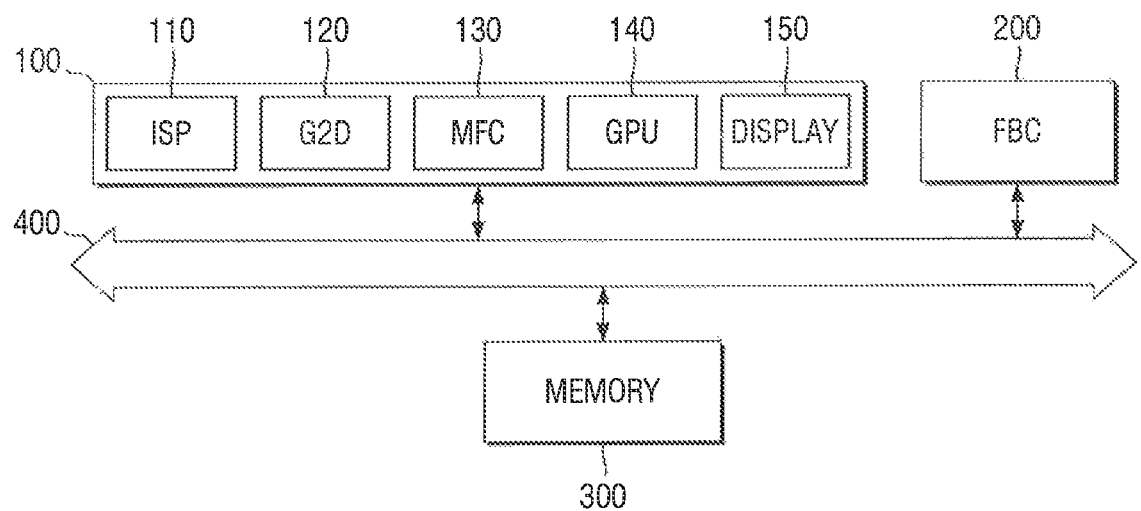
Figure 3:
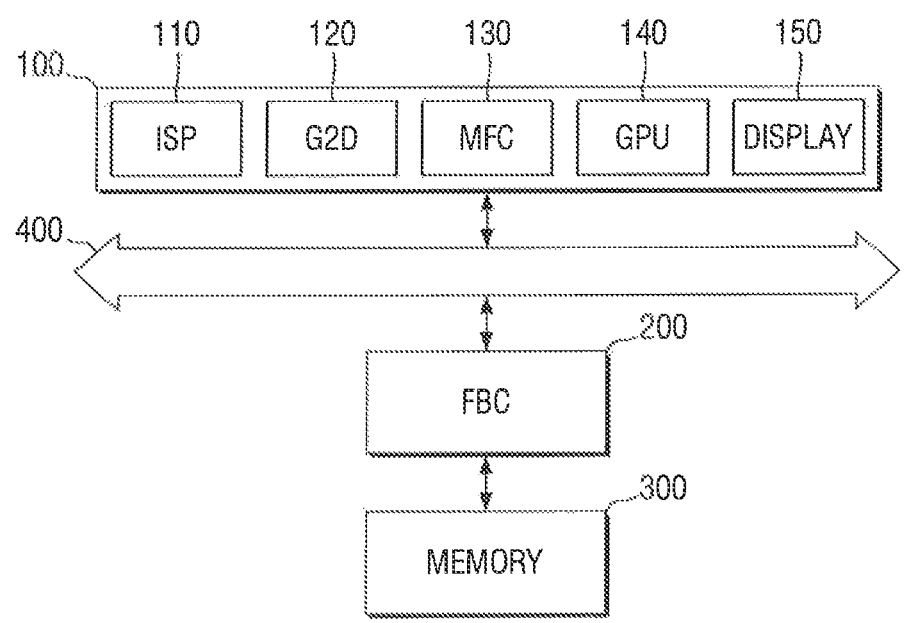

FIGS. 1 to 3 are block diagrams for explaining an image processing device according to exemplary embodiments of the present inventive concept.

Referring to FIG. 1, the image processing device according to exemplary embodiments of the present inventive concept includes a multimedia IP (Intellectual Property) 100 (e.g., an IP block, and IP core, a circuit etc.), a frame buffer compressor (FBC) 200 (e.g., a circuit, a digital signal processor, etc.), a memory 30, and a system bus 400.

In an embodiment, the multimedia IP 100 is a part of the image processing device that directly executes the image processing of the image processing device. The multimedia IP 100 may include a plurality of modules for recording and reproducing images such as camcoding and playback of video images.

The multimedia IP 100 receives first data (e.g., image data) from an outside source such as a camera, and converts the first data into second data. For example, the first data may be moving image data or raw image data. The second data is data generated by the multimedia IP 100, and may include data resulting from the multimedia IP 100 processing the first data. The multimedia IP 100 may repeatedly store the second data in the memory 300 and update the second data via various steps. The second data may include all the data used in these steps. The second data may be stored in the memory 300 in the form of third data. Therefore, the second data may be data before being stored in the memory 300 or after read from the memory 300. This will be explained in more detail below.

In an exemplary embodiment, the multimedia IP 100 includes an image signal processor ISP 110, a shake correction module G2D 120, a multi-format codec MFC 130, a GPU 140 and a display 150. However, the present inventive concept is not limited thereto. That is, the multimedia IP 100 may include at least one of the image signal processor 110, the shake correction module 120, the multi-format codec 130, the GPU 140 and the display 150. The multimedia IP 100 may be implemented by a processing module (e.g., a processor) that accesses the memory 300 in order to process data representing moving or static images.

The image signal processor 110 receives the first data, and pre-processes the first data to convert the first data into the second data. In an exemplary embodiment, the first data is an RGB type image source data. For example, the image signal processor 110 may convert the first data of the RGB type into a YUV type second data.

In an embodiment, the RGB type data means a data format which expresses colors on the basis of the three primary colors of light. That is, it is a type that expresses images, using three kinds of colors of red (RED), green (GREEN), and blue (BLUE). In contrast, the YUV type means a data format which separately expresses brightness, that is, a luma signal and a chroma signal. That is, Y means the luma signal, and U(Cb) and V(Cr) mean chroma signals, respectively. U means a difference between the luma signal and the blue signal component, and V means a difference between the luma signal and the red signal component.

The YUV type data may be acquired by converting the RGB type data using a conversion formula. For example, a conversion formula such as Y=0.3R+0.59G+0.11B, U=(B−Y)×0.493, V=(R−Y)×0.877 may be used to convert the RGB type data into the YUV type data.

Since human eyes are sensitive to the luma signal, but are less sensitive to the color signal, the YUV type data may be more easily compressed than RGB type data. As a result, the image signal processor 110 may convert the first data of the RGB type into the YUV type second data.

The image signal processor 110 converts the first data into the second data and then stores the second data in the memory 300.

The shake correction module 120 may perform the shake correction of static image data or moving image data. The shake correction module 120 may perform shake correction by reading the first data or the second data stored in the memory 300. In an embodiment, the shake correction means the detection of a shaking of the camera from the moving image data and removal of the shaking from the moving image data.

The shake correction module 120 may correct the shaking of the first data or the second data to update the first data or the second data and store the updated data in the memory 300.

The multi-format codec 130 may be a codec that compresses the moving image data.

In general, since the size of the moving image data is very large, a compression module that reduces its size is necessary. The moving image data may be compressed via association among a plurality of frames, and this compression may be performed by the multi-format codec 130. The multi-format codec 130 may read and compress the first data or the second data stored in the memory 300.

The multi-format codec 130 may compress the first data or the second data to generate updated first data or updated second data and stores the updated data in the memory 300.

The GPU (Graphics Processing Unit) 140 may perform an arithmetic process to generate two-dimensional or three-dimensional graphics. The GPU 140 may arithmetically process the first data or the second data stored in the memory 300. The GPU 140 may be specialized for graphic data processing to process portions of the graphic data in parallel.

The GPU 140 may compress the first data or the second data to generate updated first data or updated second data, and stored the updated data in the memory 300.

The display 150 may display the second data stored in the memory 300 on a screen. The display 150 may display image data processed by components of the multimedia IP 100, that is, the image signal processor 110, the shake correction module 120, the multi-format codec 130 and the GPU 140. However, the present inventive concept is not limited to these examples.

The image signal processor 110, the shake correction module 120, the multi-format codec 130, the GPU 140 and the display 150 of the multimedia IP 100 may individually operate, respectively. That is, the image signal processor 110, the shake correction module 120, the multi-format codec 130, the GPU 140 and the display 150 may individually access the memory 300 to write or read data.

In an embodiment, the frame buffer compressor 200 compresses the second data to convert the second data into third data before the multimedia IP 100 individually accesses the memory 300. The frame buffer compressor 200 transmits the third data to the multimedia IP 100, and the multimedia IP 100 transmits the third data to the memory 300.

As a result, the third data compressed by the frame buffer compressor 200 is stored in the memory 300. Conversely, the third data stored in the memory 300 may be loaded by the multimedia IP 100 and transmitted to the frame buffer compressor 200. In an embodiment, the frame buffer compressor 200 decompresses the third data to convert the third data into the second data. The frame buffer compressor 200 may transmit the second data (i.e., the decompressed data) to the multimedia IP 100.

In an embodiment, each time the image signal processor 110, the shake correction module 120, the multi-format codec 130, the GPU 140 and the display 150 of the multimedia IP 100 individually access the memory 300, the frame buffer compressor 200 compresses the second data into the third data and transfers the third data to the memory 300. For example, after one of the components of the multimedia IP 100 generates and stores the second data in the memory 300, the frame buffer compressor 200 can compress the stored data and store the compressed data into the memory 300. In an embodiment, each time a data request is transmitted from the memory 300 to the image signal processor 110, the shake correction module 120, the multi-format codec 130, the GPU 140 and the display 150 of the multimedia IP, the frame buffer compressor 200 decompresses the third data into the second data, and transmits the second data to the image data processor 110, the shake correction module 120, the multi-format codec 130, the GPU 140 and the display 150 of the multimedia IP 100, respectively.

The memory 300 stores the third data generated by the frame buffer compressor 200, and may provide the stored third data to the frame buffer compressor 200 so that the frame buffer compressor 200 can decompress the third data.

In an embodiment, the multimedia IP 100 and the memory 300 are connected to the system bus 400. Specifically, the image signal processor 110, the shake correction module 120, the multi-format codec 130, the GPU 140 and the display 150 of the multimedia IP 100 may be individually connected to the system bus 400. The system bus 400 may be a path through which the image signal processor 110, the shake correction module 120, the multi-format codec 130, the GPU 140, the display 150 and the memory 300 of the multimedia IP 100 transfer data to each other.

The frame buffer compressor 200 is not connected to the system bus 400, and performs the operation of converting the second data into the third data (e.g., image compression) and converting the third data into the second data (e.g., image decompression) when the image signal processor 110, the shake correction module 120, the multi-format codec 130, the GPU 140 and the display 150 of the multimedia IP 100 access the memory, respectively.

Next, referring to FIG. 2, the frame buffer compressor 200 of the image processing device according to an exemplary embodiment of the present inventive concept is directly connected to the system bus 400.

The frame buffer compressor 200 is not directly connected to the multimedia IP 100 and is connected to the multimedia IP 100 via the system bus 400. Specifically, each of the image signal processor 110, the shake correction module 120, the multi-format codec 130, the GPU 140 and the display 150 of the multimedia IP 100 may transmit the data to and from the frame buffer compressor 200 through the system bus 400, and may transmit the data to the memory 300 accordingly.

That is, in the process of compression, each of the image signal processor 110, the shake correction module 120, the multi-format codec 130, the GPU 140 and the display 150 of the multimedia IP 100 may transmit the second data to the frame buffer compressor 200 through the system bus 400. Subsequently, the frame buffer compressor 200 may compress the second data into the third data and transmit the third data to the memory 300 via the system bus 400.

Likewise, even in the process of decompression, the frame buffer compressor 200 may receive the third data stored in the memory 300 via the system bus 400, and may decompress it to the second data. Subsequently, the frame buffer compressor 200 may transmit the second data to each of the image signal processor 110, the shake correction module 120, the multi-format codec 130, the GPU 140 and the display 150 of the multimedia IP 100 via the system bus 400.

Referring to FIG. 3, in an image processing device according to an exemplary embodiment of the present inventive concept, a memory 300 and a system bus 400 are connected to each other via a frame buffer compressor 200.

That is, the memory 300 is not directly connected to the system bus 400 but is connected to the system bus 400 only via the frame buffer compressor 200. Further, the image signal processor 110, the shake correction module 120, the multi-format codec 130, the GPU 140 and the display 150 of the multimedia IP 100 are directly connected to the system bus 400. Therefore, the image signal processor 110, the shake correction module 120, the multi-format codec 130, the GPU 140 and the display 150 of the multimedia IP 100 access the memory 300 only through the frame buffer compressor 200.

In the present specification, the second data is referred to as an image data 10, and the third data is referred to as compressed data 20.

Figure 4:
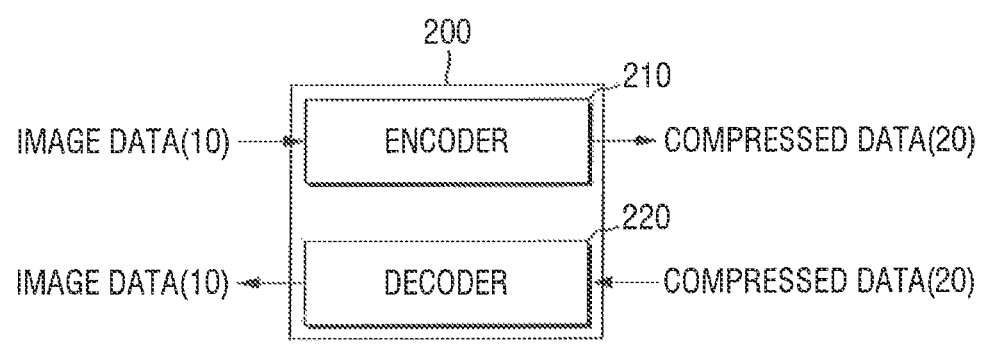
FIG. 4 is a block diagram for explaining a frame buffer compressor of FIGS. 1 to 3 in detail.

FIG. 4 is a block diagram for explaining the frame buffer compressor of FIGS. 1 to 3 in detail.

Referring to FIG. 4, the frame buffer compressor 200 includes an encoder 210 (e.g., an encoding circuit) and a decoder 220 (e.g., a decoding circuit).

The encoder 210 may receive the image data 10 from the multimedia IP 100 to generate the compressed data 20. The image data 10 may be transmitted from each of the image signal processor 110, the shake correction module 120, the multi-format codec 130, the GPU 140 and the display 150 of the multimedia IP 100. The compressed data 20 may be transmitted to the memory 300 via the multimedia IP 100 and the system bus 400.

Conversely, the decoder 220 may decompress the compressed data 20 stored in the memory 300 into the image data 10. The image data 10 may be transferred to the multimedia IP 100. The image data 10 may be transmitted to each of the image signal processor 110, the shake correction module 120, the multi-format codec 130, the GPU 140 and the display 150 of the multimedia IP 100.

Figure 5:
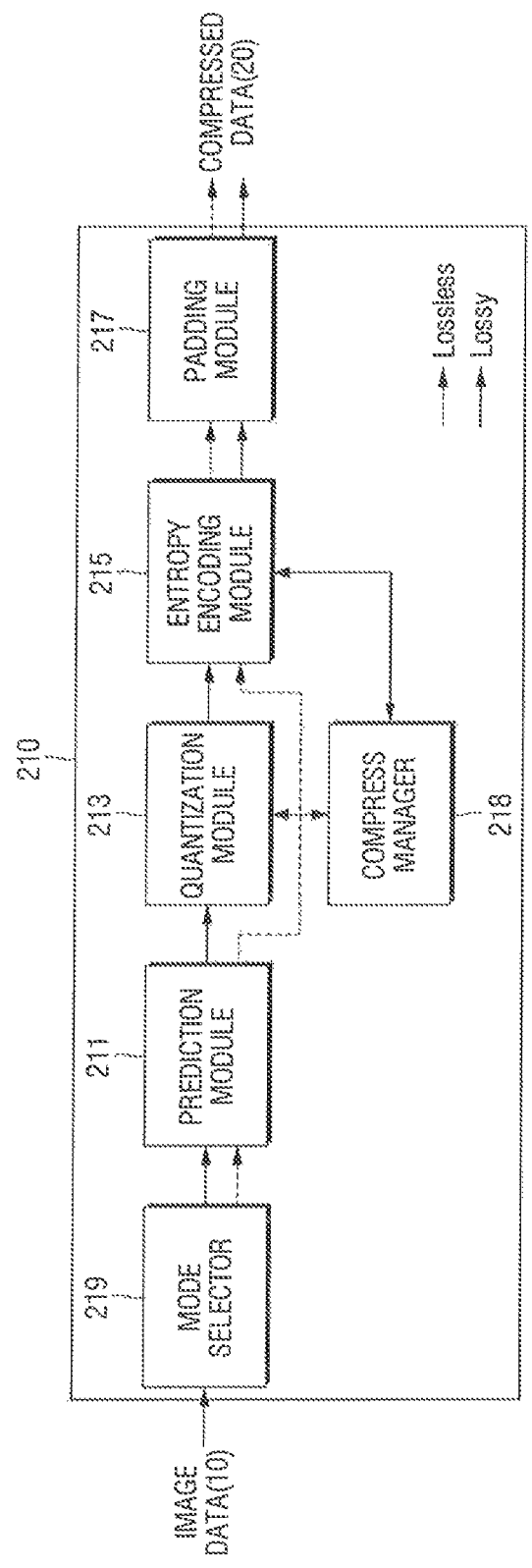
FIG. 5 is a block diagram for explaining an encoder of FIG. 4 in detail.

FIG. 5 is a block diagram for explaining the encoder of FIG. 4 in detail.

Referring to FIG. 5, the encoder 210 includes a first mode selector 219 (e.g., a logic circuit), a prediction module 211 (e.g., a logic circuit), a quantization module 213 (e.g., a logic circuit), an entropy encoding module 215 (e.g., a logic circuit) and a padding module 217 (e.g., a logic circuit).

In an embodiment, the first mode selector 219 determines whether the encoder 210 operates in a lossless mode or a lossy mode. When the encoder 210 operates in the lossless mode in accordance with the first mode selector 219, the image data 10 is compressed along the lossless path (Lossless) of FIG. 5, and when the encoder 210 operates in the lossy mode, the image data 10 is compressed along the lossy path (Lossy).

The first mode selector 219 may receive a signal from the multimedia IP 100 which is used to determine whether to perform the lossless compression or perform the lossy compression. The lossless compression means compression without loss of data. A compression ratio may change depending on the data being losslessly compressed. Unlike lossless compression, the lossy compression is compression in which data is partly lost. The lossy compression has a higher compression ratio than the lossless compression, and may have a fixed compression ratio set in advance.

In the case of the lossless mode, the first mode selector 219 enables the image data 10 to flow along the lossless path (Lossless) to the prediction module 211, the entropy encoding module 215 and the padding module 217. Conversely, in the lossy mode, the first mode selector 219 enables the image data 10 to flow along the lossy path (Lossy) to the prediction module 211, the quantization module 213 and the entropy encoding module 215.

The prediction module 211 may compress the image data 10 by dividing the image data 10 into prediction data and residual data. The prediction data and the residual data together take up less space than the image data 10. In an embodiment, the prediction data is image data of one pixel of the image data and the residual data is created from the differences between the prediction data and the image data of the pixels of the image data that are adjacent the one pixel. For example, if the image data of the one pixel has a value between 0 and 255, 8 bits may be needed to represent this value. When the adjacent pixels have similar values to that of the one pixel, the residual data of each of the adjacent pixels is much smaller than prediction data, and thus the number of data bits representing the image data 10 may be greatly reduced. For example, when pixels having values of 253, 254, and 255 are consecutive, if the prediction data is set as 253, the residual data representation of (253 (prediction), 1 (residue), and 2 (residue)) is sufficient, and the number of bits per pixel for expressing these residual data may be decreased from 8 bits to 2 bits. For example, 24 bits of data of 253, 254, and 255 can be reduced to 12 bits due to 8 bit prediction data of 253 (11111101), 2 bit residual data of 254−251=1 (01), and 2 bit residual data of 255−253=2 (10).

Therefore, the prediction module 211 may compress the overall size of the image data 10 by dividing the image data 10 into prediction data and residual data. Various methods are available for setting the type of the prediction data.

The prediction module 211 may perform prediction on a pixel basis or may perform prediction on a block basis. In this case, the block may mean a region formed by a plurality of adjacent pixels. For example, prediction on a pixel basis could mean that all the residual data is created from one of the pixels, and prediction on the block basis could mean that residual data is created for each block from a pixel of the corresponding block.

The quantization module 213 may further compress the image data 10 that was compressed by the prediction module 211. In an exemplary embodiment, the quantization module 213 removes the lower bits of the image data 10 through a preset quantization coefficient. Specifically, the representative value is selected by multiplying the data by the quantization coefficient, but a loss may occur by truncating the decimal part. If the value of the pixel data is between 0 and $2^8-1$ (=255), the quantization coefficient may be defined as $/(2^n-1)$ (where, n is an integer less than or equal to 8). However, the present embodiment is not limited thereto. For example, if the prediction data is 253 (11111101), the prediction data can be reduced from 8 bits to 6 bits by removing the lower 2 bits, which results in prediction data of (111111) 252.

However, the removed lower bits are not restored later and thus are lost. Therefore, the quantization module 213 is utilized only in the lossy mode. However, since the lossy mode has a compression ratio relatively higher than that in the lossless mode and may have a fixed compression ratio set in advance, information on the compression ratio is not separately required later.

The entropy encoding module 215 may compress the image data 10 compressed by the quantization module 213 in the lossy mode or the image data 10 compressed by the prediction module 211 in the lossless mode through entropy coding. In an embodiment, the entropy coding utilizes a method for allocating a number of bits depending on frequency.

In an exemplary embodiment, the entropy encoding module 215 compresses the image data 10, using Huffman coding. In an alternative embodiment, the entropy encoding module 215 compresses the image data 10 via exponential golomb coding or golomb rice coding. In an embodiment, the entropy encoding module 215 determines an entropy coding value (e.g., a k value) from the data it is to be compress, creates a table from the k value, and compresses the image data 10 using the table.

The padding module 217 may perform padding on the image data 10 compressed by the entropy encoding module 215 in the lossless mode. Here, the padding may mean addition of meaningless data to match a specific size. This will be explained in more detail below.

The padding module 217 may be enabled not only in the lossless mode but also in the lossy mode. In the lossy mode, the image data 10 may be compressed further than the desired compression ratio when compressed by the quantization module 213. In such a case, even in the lossy mode, the image data 10 may be converted into the compressed data 20 via the padding module 217 and transmitted to the memory 300. In an exemplary embodiment, the padding module 217 is omitted so that no padding is performed.

The compression management module 218 determines a combination of a quantization parameter (QP) table and the entropy table each used for quantization and entropy coding, and controls the compression of the image data 10 in accordance with a combination of the determined QP table and the entropy table.

In this case, the first mode selector 219 determines that the encoder 210 operates in the lossy mode, and the image data 10 is compressed along the lossy path (Lossy) of FIG. 5 accordingly. That is, the configuration in which the compression management module 218 determines the combination of the QP table and the entropy table, and compresses the image data 10 in accordance with the combination of the determined QP table and the entropy table, is premised on the case where the frame buffer compressor 200 compresses the image data 10 using a lossy compression algorithm.

Specifically, the QP table includes one or more entries, and each entry may include quantization coefficients used for quantizing the image data 10.

In an embodiment, the entropy table includes a plurality of code tables which are identified using the k value to execute the entropy coding algorithm. The entropy table which may be used in some embodiments of the present inventive concept include at least one among an exponential golomb code and a golomb rice code.

The compression management module 218 determines a QP table including the predetermined number of entries, and the frame buffer compressor 200 performs the quantization of the predicted image data 10, using the determined QP table. In addition, the compression management module 218 determines an entropy table, using the predetermined number of k values, and the frame buffer compressor 200 performs the entropy coding on the quantized image data 10, using the determined entropy table. That is, the frame buffer compressor 200 generates the compressed data 20 on the basis of the combination of the QP table and the entropy table determined by the compression management module 218.

Thereafter, the frame buffer compressor 200 may write the generated compressed data 20 to the memory 300. Also, the frame buffer compressor 200 may read the compressed data 20 from the memory 300, and decompress the read compressed data 20 to generate a decompressed data to provide the decompressed data to the multimedia IP 100.

More details of the compression management module 218 for executing such operations will be described later with reference to FIGS. 7 to 16.

Figure 6:
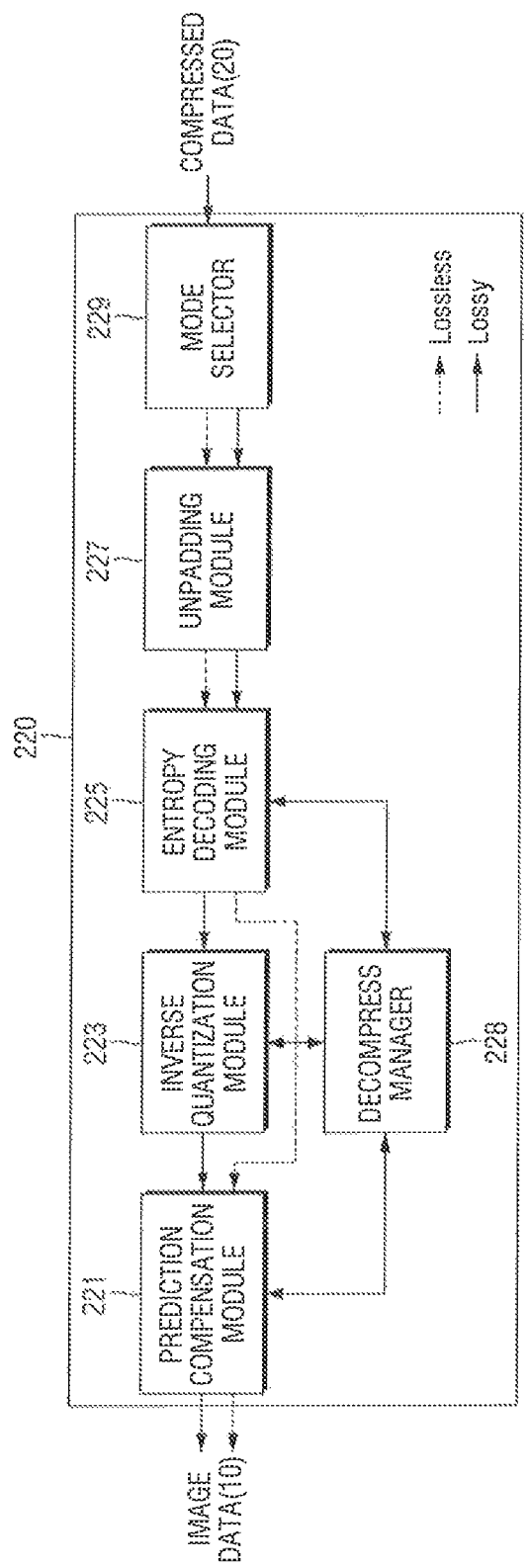
FIG. 6 is a block diagram for explaining a decoder of FIG. 4 in detail.

FIG. 6 is a block diagram for explaining the decoder of FIG. 4 in more detail.

Referring to FIG. 6, the decoder 220 includes a second mode selector 229 (e.g., a logic circuit), an unpadding module 227 (e.g., a logic circuit), an entropy decoding module 225 (e.g., a logic circuit), an inverse quantization module 223 (e.g., a logic circuit), and a prediction compensation module 221 (e.g., a logic circuit).

The second mode selector 229 determines whether or not the compressed data 20 stored in the memory 300 has been compressed in a lossless manner or a lossy manner. In an exemplary embodiment, the second mode selector 229 determines whether the compressed data 20 has been compressed by the lossless mode or the lossy mode through the presence or absence of a header. This will be explained in more detail below.

In the case of the lossless mode, the second mode selector 229 enables the compressed data 20 to flow along the lossless path (Lossless) to the unpadding module 227, the entropy decoding module 225 and the prediction compensation module 221. Conversely, in the case of the lossy mode, the second mode selector 229 enables the compressed data 20 to flow along the lossy path (Lossy) to the entropy decoding module 225, the inverse quantization module 223 and the prediction compensation module 221.

The unpadding module 227 removes the padded portion of the data which is padded by the padding module 217 of the encoder 210. The unpadding module 227 may be omitted when the padding module 217 is omitted.

The entropy decoding module 225 may decompress the data compressed by the entropy encoding module 215. The entropy decoding module 225 may perform the decompression via Huffman coding, exponential golomb coding or golomb rice coding. Since the compressed data 20 includes the k value, the entropy decoding module 225 may perform the decoding, using the k value.

The inverse quantization module 223 may decompress the data compressed by the quantization module 213. The inverse quantization module 223 may restore the compressed data 20 compressed using the quantization coefficient determined by the quantization module 213, but it is not possible to completely restore the part which is lost in the process of compression Therefore, the inverse quantization module 223 is utilized only in the lossy mode.

The prediction compensation module 221 may restore the data represented by the prediction data and the residual data generated by the prediction module 211. The prediction compensation module 221 may, for example, convert the residual data representation of (253 (prediction), 1 (residue), and 2 (residue)) into 253, 254, and 255. For example, the prediction compensation module 221 may restore the data by adding the residual data to the prediction data.

The prediction compensation module 221 may restore the prediction executed in units of pixels or blocks in accordance with the prediction module 211. As a result, the compressed data 20 may be restored or decompressed and may be transmitted to the multimedia IP 100.

The decompression management module 228 may perform a work in which the combination of the QP table and the entropy table determined by the compression management module 218 described above with reference to FIG. 5 to execute compression of the image data 10 can be properly reflected when decompressing the compressed data 20.

The operation of the above-described image processing device will now be described with reference to FIGS. 7 to 16.

FIGS. 7 to 10 are schematic diagrams for explaining an operation of the image processing device according to an exemplary embodiment of the present inventive concept.

Referring to FIG. 7, the compression management module 218 determines a QP table 230 includes a predetermined number of entries. In this embodiment, the compression management module 218 determines the QP table 230 includes eight entries that enable quantization of eight levels.

The QP table 230 includes a first entry and a second entry. Here, the first entry is a quantization coefficient corresponding to index 0, and the second entry is a quantization coefficient corresponding to index 7. Further, the QP table 230 includes one or more third entries between the first entry and the second entry. In the present embodiment, one or more third entries correspond to the quantization coefficients corresponding to the indices 1 to 6.

The first entry is determined as a predetermined first value. In the present embodiment, the predetermined first value is represented by "MaxShiftValue". The first value is a constant value that may be arbitrarily determined as necessary in actual implementation of the image processing device or the method for operating the image processing device according to the various embodiments of the present inventive concept.

After the first entry is determined as the first value, the second entry is determined by the following equation:

$$\text{MaxShiftValue} \gg \text{BitDepth} * (1 - \text{CompressionRatio})$$

Here, MaxShiftValue represents the aforementioned first value, BitDepth represents the bit depth of the image data 10, and CompressionRatio represents the compression ratio.

That is, when the first values are equal and the target compression ratios are equal, the compression management module 218 may differently set the final values of the QP table 230 in accordance with the bit depth of the image data 10.

In this way, after the first entry is determined as the first value and the second entry is determined as the second value, the third entries may be determined via sampling. That is, in the QP table 230 including the predetermined number of entries, the third entries may be sampled so that the quantization coefficient is properly distributed, for the remaining third entries except the first entry and the second entry.

On the other hand, the compression management module 218 may determine the entropy table, using a predetermined number of k values. In some embodiments of the present disclosure, the entropy table is determined by a maximum of 4 or less k values.

Concretely, the entropy table may be defined by the k value of n, n+1, n+2, and n+3 (where n is an integer of 0 or more) for the image data 10 having the first bit depth, and may be defined by the k value of n+a, n+a+1, n+a+2, and n+a+3 (where, a is an integer of 1 or more) for the image data 10 having a second bit depth larger than the first bit depth.

For example, the entropy table may be determined by the k values 0, 1, 2, and 3 for the image data having the first bit depth of 8 bits, and may be determined by the k values of 1, 2, 3, and 4, for the image data having the second bit depth of 10 bits.

That is, the compression management module 218 may differently set, for example, four consecutive k values in accordance with the bit depth of the image data 10.

When performing the block-based lossy compression of the image data 10, the prediction, quantization, and entropy coding steps are performed as described above. In the case of quantization, as the QP table including the quantization factors has the more entries, it is possible to more delicately perform the compression. However, the memory resources are consumed to maintain the QP table with multiple entries, and the number of bits of the stream header of the compressed data 20 transmitted and received between the encoder 210 and the decoder 220 of the frame buffer controller 200 may increase. In particular, in an environment in which the compression is performed on the image data 10 in units of blocks, even if the header of the stream of the compressed data 20 increases only by one bit, when considering the overall image size, a considerable amount of bandwidths may be consumed.

Further, in the case of the entropy coding, since the distribution of the residue signal (residual) is different between the case of image data, for example, having the bit depth of 8 bits and the case of image data having, for example, the bit depth of 10 bits, the entropy table used for the entropy coding also needs to be determined differently. For example, since the tendency of the value of the entropy table entry to converge to 0 becomes lower in the case of the image data having the bit depth of 10 bits than in the case of the image data having the bit depth of 8 bits, it is necessary to differently determine the k value depending on the bit depth.

Accordingly, by determining the QP table of an appropriate size with good compression quality and by selecting an appropriate k value in consideration of the distribution of the residue signal to determine the entropy table, the bandwidth between the frame buffer compressor 200 and the memory 300 can be reduced, while enhancing the compression performance of the image data 10.

In some embodiments of the present inventive concept, the compression management module 218 determines a QP table including the maximum 16 entries. Also, in some embodiments of the present disclosure, the compression management module 218 determines the QP table including eight or more entries.

Next, referring to FIG. 8, the compression management module 218 determines the QP table 232 including the eight entries.

As an example, it is assumed that the first entry of the QP table 232 is determined as 4096. The compression management module 218 performs a bit shift operation on 4096 corresponding to the first value by BitDepth*(1−CompressionRatio) as follows.

$$4096 >> 8 \times (1-0.5) = 256$$

Here, 8 is a value corresponding to the bit depth of the image data 10, and 0.5 (e.g., 50%) is a value corresponding to the target compression ratio.

In this way, after the first entry is determined as 4096 and the second entry is determined as 256, the third entries may be determined through sampling. That is, in the QP table 232 including eight entries, the third entries may be determined, for example, as 1365, 819, 585, 455, 372, and 315 such that the quantization coefficients are properly distributed, for the third entry corresponding to the remaining indexes 1 to 6 except the first entry 4096 and the second entry 256. The entries of the QP table 242 determined thus may also be used as a quantization coefficient by being divided by, for example, 4096 which is the MaxShiftValue value.

In an embodiment, the compression management module 218 determines the k value as 0, 1, 2, and 3 when the image data 10 has a bit depth of 8 bits, and determines the k value as 1, 2, 3, and 4 when the image data 10 has the bit depth of 10 bits.

In this way, since the compression management module 218 determines a combination of the QP table and the entropy table each used for quantization and entropy coding, and controls the image data 10 in accordance with a combination of the determined QP table and the entropy table, it is possible to reduce the bandwidth between the frame buffer compressor 200 and the memory 300, while enhancing the compression performance of the image data 10.

Next, referring to FIG. 9, the compression management module 218 determines the QP table 234 including the eight entries.

For example, it is assumed that the first entry of the QP table 234 is determined as 4096. The compression management module 218 performs a bit shift operation on 4096 corresponding to the first value by BitDepth*(1−CompressionRatio) as follows.

$$4096 >> 10 \times (1-0.5) = 128$$

Here, 10 is a value corresponding to the bit depth of the image data 10, and 0.5 is a value corresponding to the target compression ratio.

In this way, after the first entry is determined as 4096 and the second entry is determined as 128, the third entries may be determined through sampling. That is, in the QP table 234 including eight entries, the third entries may be determined, for example, as 819, 455, 293, 216, 171, and 146 so that the quantization coefficients are appropriately distributed, for the third entry corresponding to the remaining indexes 1 to 6 except the first entry 4096 and the second entry 128. The entries of the QP table 242 determined in this way may also be used as a quantization coefficient by being divided by, for example, 4096 which is the MaxShiftValue value.

In an embodiment, the compression management module 218 determines the k value as 0, 1, 2, and 3 when the image data 10 has a bit depth of 8 bits, and determines the k value as 1, 2, 3, and 4 when the image data 10 has a bit depth of 10 bits.

In this way, the compression management module 218 determines a combination of the QP table and the entropy table each used for quantization and entropy coding, and controls the compression of the image data 10 in accordance with the determined combination of the QP table and the entropy table. Thus, it is possible to reduce the bandwidth between the frame buffer compressor 200 and the memory 300, while enhancing the compression performance of the image data 10.

Next, referring to FIG. 10, the compressed bit stream 236 generated from the encoder 210 of the frame buffer compressor 200 through the aforementioned process as described above includes a header including QP table information of 4 bits and k value information of 2 bits, and includes compressed data 20 as a compressed binary following the header.

FIGS. 11 to 14 are schematic diagrams for explaining an operation of the image processing device according to exemplary embodiments of the present disclosure.

Referring to FIG. 11, the compression management module 218 determines a QP table 240 that includes a predetermined number of entries. In this embodiment, the compression management module 218 determines the QP table 240 having 16 entries that enables quantization of 16 levels.

The QP table 240 includes a first entry and a second entry. Here, the first entry is a quantization coefficient corresponding to index 0, and the second entry is a quantization coefficient corresponding to index 15. The QP table 240 includes one or more third entries between the first entry and the second entry. In the present embodiment, one or more third entries correspond to the quantization coefficients corresponding to the indices 1 to 14.

After the first entry is determined as the first value and the second entry is determined as the second value, the third entries may be determined through sampling. That is, the third entry may be sampled such that the quantization coefficient is properly distributed for the remaining third entries except the first entry and the second entry, in the QP table 240 that includes a predetermined number of entries.

In an embodiment, the compression management module 218 may determine the entropy table using a predetermined number of k values. In some embodiments of the present inventive concept, the entropy table may be determined by k values of maximum of 4 or less.

For example, the entropy table may be determined by k values of 0, 1, 2, and 3 for the image data having the first bit depth of 8 bits, and may be determined by k values of 1, 2, 3, and 4, for the image data having a second bit depth of 10 bits.

That is, the compression management module 218 may differently set, for example, four consecutive k values in accordance with the bit depth of the image data 10.

Next, referring to FIG. 12, the compression management module 218 determines a QP table 242 including 16 entries.

For example, it is assumed that the first entry of the QP table 242 is determined as 4096. The compression management module 218 performs a bit shift operation on 4096 corresponding to the first value by BitDepth*(1−CompressionRatio) as follows.

$$4096 >> 8 \times (1-0.5) = 256$$

Here, 8 is a value corresponding to the bit depth of the image data 10, and 0.5 is a value corresponding to the target compression ratio.

In this way, after the first entry is determined as 4096 and the second entry is determined as 256, the third entries may be determined through sampling. That is, in the QP table 232 including eight entries, the third entries may be determined, for example, as 2048, 1365, 1024, 819, 683, 585, 512, 455, 410, 372, 341, 315, 293, and 273 so that the quantization coefficients are appropriately distributed, for the third entries corresponding to the remaining indexes 1 to 14 except the first entry 4096 and the second entry 256. The entries of the QP table 242 determined thus may also be used as a quantization coefficient by being divided by, for example, 4096 which is a MaxShiftValue value.

In an embodiment, the compression management module 218 may determine the k value as 0, 1, 2, and 3 when the image data 10 has the bit depth of 8 bits, and may determine the k value as 1, 2, 3, and 4 when the image data 10 has the bit depth of 10 bits.

In this way, since the compression management module 218 determines a combination of the QP table and the entropy table each used for quantization and entropy coding, and controls the compression of the image data 10 in accordance with the determined combination of the QP table and the entropy table, it is possible to reduce the bandwidth between the frame buffer compressor 200 and the memory 300, while enhancing the compression performance of the image data 10.

Next, referring now to FIG. 13, the compression management module 218 determines a QP table 244 including eight entries.

Assuming that the first entry of the QP table 244 is determined as 4096. The compression management module 218 performs a bit shift operation on 4096 corresponding to the first value by BitDepth*(1−CompressionRatio) as follows.

$$4096 >> 10 \times (1-0.5) = 128$$

Here, 10 is a value corresponding to the bit depth of the image data 10, and 0.5 is a value corresponding to the target compression ratio.

In this way, after the first entry is determined as 4096 and the second entry is determined as 128, the third entries may be determined through sampling. That is, in the QP table 234 including eight entries, the third entries may be determined, for example, as 1365, 819, 585, 455, 372, 315, 273, 228, 205, 186, 171, 158, 146, and 137 so that the quantization coefficients are properly distributed, for the third entries corresponding to the remaining indexes 1 to 14 except the first entry 4096 and the second entry 128. The entries of the QP table 242 determined thus may also be used as a quantization coefficient by being dividing by, for example, 4096 which is a MaxShiftValue value.

In an embodiment, the compression management module 218 may determine the k value as 0, 1, 2, and 3 when the image data 10 has a bit depth of 8 bits, and may determine the k value as 1, 2, 3, and 4 when the image data 10 has a bit depth of 10 bits.

In this way, since the compression management module 218 determines a combination of the QP table and the entropy table each used for quantization and entropy coding, and controls the compression of the image data in accordance with the determined combination of the QP table and the entropy table, it is possible to reduce the bandwidth between the frame buffer compressor 200 and the memory 300, while enhancing the compression performance of the image data 10.

Figures 14, 15:

Next, referring to FIG. 14, the compressed bit stream 246 generated from the encoder 210 of the frame buffer compressor 200 through the aforementioned process as described above includes a header including QP table information of 4 bits and k value information of 2 bits, and includes the compressed data 20 as a compression binary following the header.

FIG. 15 is a diagram for explaining advantageous effects of the image processing device and the method for operating the image processing device according to some exemplary embodiments of the present inventive concept.

Referring to FIG. 15, when the number of entries of the QP table is 12 and the number of values of k is 4, the best PSNR gain is illustrated.

That is, by determining the QP table of an appropriate size with good compression quality, and by choosing an appropriate k value in consideration of the distribution of the residue signal to determine the entropy table, the bandwidth between the frame buffer compressor 200 and the memory 300 can be reduced, while enhancing the compression performance of the image data 10.

Figure 16:
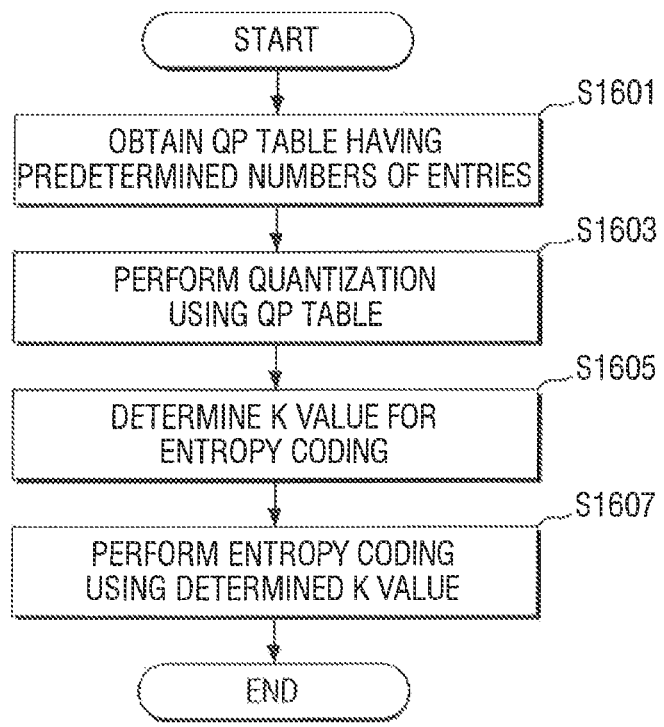
FIG. 16 is a flowchart illustrating a method for operating the image processing device according to exemplary embodiments of the present inventive concept.

FIG. 16 is a flowchart illustrating a method for operating an image processing device according to an exemplary embodiment of the present inventive concept.

Referring to FIG. 16, the method for operating the image processing device according to an exemplary embodiment of the present inventive concept includes determining a QP table that includes a predetermined number of entries (S1601).

In an embodiment of the present inventive concept, determination of the QP table including the predetermined number of entries includes determination of a QP table including maximum 16 entries. In another embodiment of the present inventive concept, determination of the QP table including the predetermined number of entries includes determination of the QP table including eight or more entries.

Further, the above method includes performing quantization on predicted image data, using the determined QP table (S1603).

In addition, the method includes determining an entropy table, using a predetermined number of k values (S1605).

In an embodiment of the present inventive concept, determination of the entropy table includes determination of the entropy table, using a maximum of 4 or less k values.

Further, the above method includes performing entropy coding on the quantized image data using the determined entropy table to generate compressed data (S1607).

Those skilled in the art will appreciate that many variations and modifications may be made to the exemplary embodiments without substantially departing from the principles of the present inventive concept.

What is claimed is:

1. An image processing device comprising:
a multimedia intellectual property (IP) block configured to process image data;
a memory; and
a frame buffer compressor (FBC) configured to compress the image data to generate compressed data and store the compressed data in the memory,
wherein the frame buffer compressor includes a logic circuit configured to determine a combination of a quantization parameter (QP) table and an entropy table and control compression of the image data based on the determined combination of the QP table and the entropy table,
wherein the QP table includes a first entry having a first predetermined value and a second entry, wherein a value of the second entry is determined based on shifting the predetermined first value by a second value, wherein the second value is determined from a bit depth of the image data and a target compression ratio.

2. The image processing device of claim 1, wherein the frame buffer compressor writes the compressed data generated based on the combination of the QP table and the entropy table to the memory.

3. The image processing device of claim 1, wherein the frame buffer compressor reads the compressed data from the memory, decompresses the read compressed data to generate a decompressed data, and provides the decompressed data to the multimedia IP block.

4. The image processing device of claim 1, wherein the frame buffer compressor compresses the image data, using a lossy compression algorithm.

5. The image processing device of claim 1, wherein the QP table includes a first entry and a second entry,
the first entry is the predetermined first value, and
second entry is determined by the following equation:

$$\text{MaxShiftValue} \gg \text{BitDepth} * (1 - \text{Compression Ratio})$$

where, MaxShiftValue is the predetermined first value, BitDepth is the bit depth of the image data, and CompressionRatio is the target compression ratio.

6. The image processing device of claim 5, wherein the QP table includes one or more third entries between the first entry and the second entry, and
each of the third entries is determined through sampling.

7. The image processing device of claim 1, wherein the entropy table is determined by a maximum of 4 or less k values for entropy encoding.

8. The image processing device of claim 7, wherein the k values includes values of n, n+1, n+2, and n+3 when the image data has a first bit depth, and
wherein the k values includes values of n+a, n+a+1, n+a+2, and n+a+3 when the image data has a second bit depth larger than the first bit depth,
wherein n is an integer $\geq= 0$ and a is an integer $\geq= 1$.

9. An image processing device comprising:
a multimedia intellectual property (IP) block configured to process image data; a memory; and
a frame buffer compressor (FBC) configured to compress the image data to generate compressed data and store the compressed data in the memory,
wherein the frame buffer compressor includes a logic circuit configured to determine a quantization parameter (QP) table including a first number of entries and an entropy table having a second number of k values for entropy encoding, and control compression of the image data in accordance with the determined QP table and the determined entropy table,
wherein the QP table includes a first entry and a second entry,
the first entry is a predetermined first value, and
the second entry is determined by the following equation:

$$\text{MaxShiftValue} \gg \text{BitDepth} * (1 - \text{Compression Ratio})$$

where, MaxShiftValue is the first value, BitDepth is a bit depth of the image data, and Compression Ratio is a compression ratio.

10. The image processing device of claim 9, wherein the QP table includes one or more third entries between the first entry and the second entry,
wherein the third entry is determined through sampling.

11. The image processing device of claim 9, wherein the k values include values of n, n+1, n+2, and n+3 when the image data has a first bit depth, and
wherein the k values includes values of n+a, n+a+1, n+a+2, and n+a+3 when the image data has a second bit depth larger than the first bit depth,
wherein n is an integer $\geq= 0$ and a is an integer $\geq= 1$.

12. A method for operating an image processing device, the method comprising:
converting image data into predicted image data comprising prediction data and residual data;
selecting a peak signal-to-noise ratio (PSNR) gain range from a table;
determining a first number of quantization parameter (QP) entries and a second number of k values associated with an entry of the table including the selected PSNR gain range;
determining a QP table including the first number of the QP entries;
quantizing the predicted image data to generate quantized image data, using the determined QP table;
determining an entropy table, using the second number of the k values for an entropy encoding; and
performing the entropy coding on the quantized image data, using the determined entropy table, to generate compressed data.

13. The method of claim 12, wherein the determining of the QP table including the first number of entries comprises:
determining a QP table including a maximum of 16 entries.

14. The method of claim 13, wherein determining of the QP table including the first number of entries comprises:
determining a QP table including eight or more entries.

15. The method of claim 12, wherein the QP table includes a first entry and a second entry, and
the determining of the QP table including the first number of entries comprises:
determining the first entry as a predetermined first value, and determining the second entry by the following equation:

$$\text{MaxShiftValue} \gg \text{BitDepth} * (1 - \text{Compression Ratio})$$

where, MaxShiftValue is the first value, BitDepth is a bit depth of the image data, and Compression Ratio is a compression ratio.

16. The method of claim 15, wherein the QP table includes one or more third entries between the first entry and the second entry, and determining of the QP table including the first number of entries comprises:

determining the third entry through sampling.

17. The method of claim 12, wherein the determining of the entropy table comprises: determining the entropy table, using a maximum of 4 or less k values for entropy encoding.

18. The method of claim 12, wherein the determining of the entropy table comprises: determining the entropy table using the k values of n, n+1, n+2, and n+3 when the image data has a first bit depth, and determining the entropy table using the k values of n+a, n+a+1, n+a+2, and n+a+3 when the image data has a second bit depth larger than the first bit depth, wherein n is an integer $>=0$, and wherein a is an integer $>=1$.

19. The method of claim 12, wherein the entropy table includes at least one of an exponential golomb code and a golomb rice code.

* * * * *